July 9, 1935.  B. A. PROCTOR  2,007,214
REPEATING MECHANISM FOR PROJECTING MACHINES
Original Filed Nov. 28, 1925  2 Sheets-Sheet 2
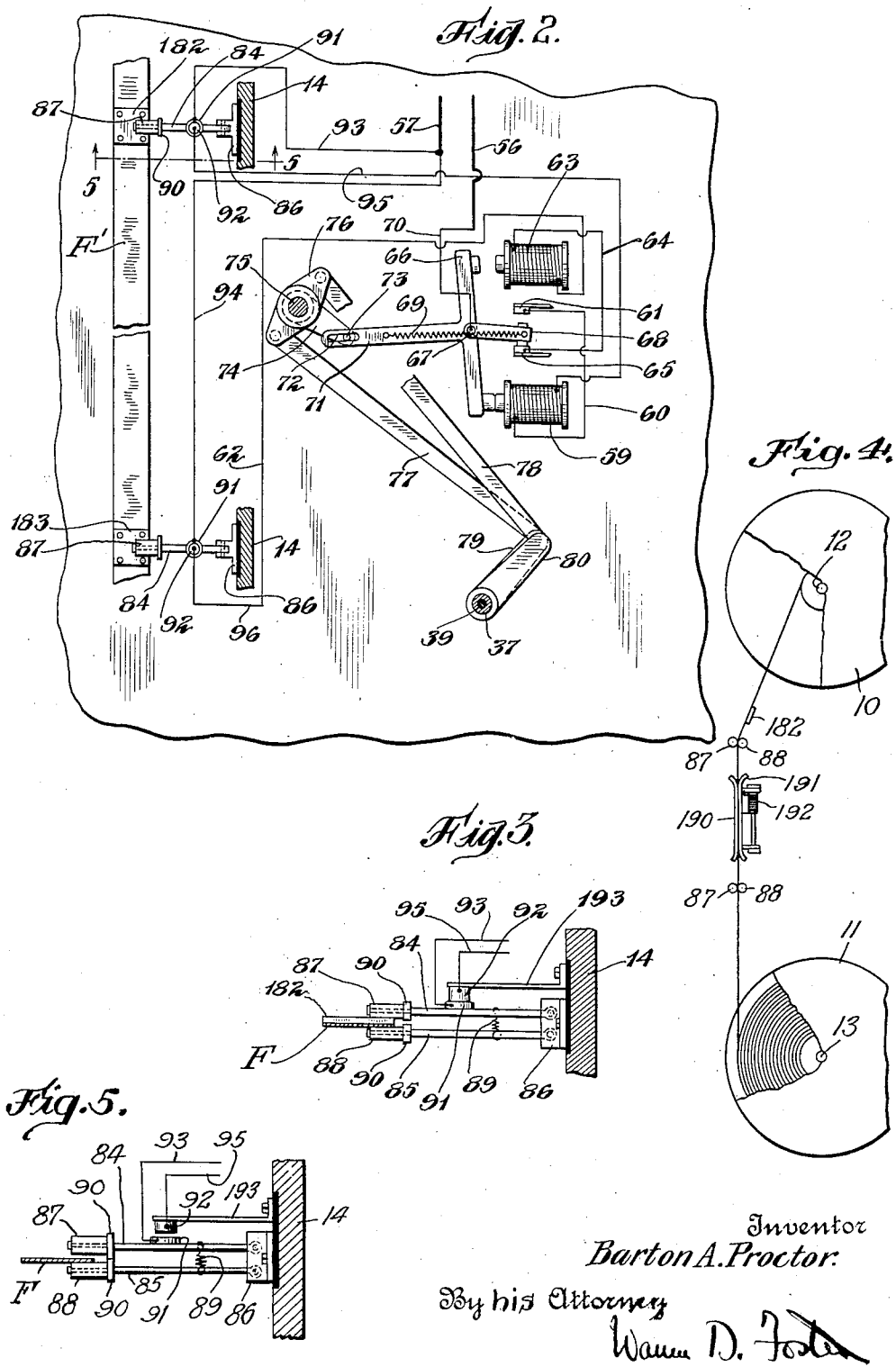
Inventor
Barton A. Proctor.
By his Attorney
Warren D. Foster Patented July 9, 1935

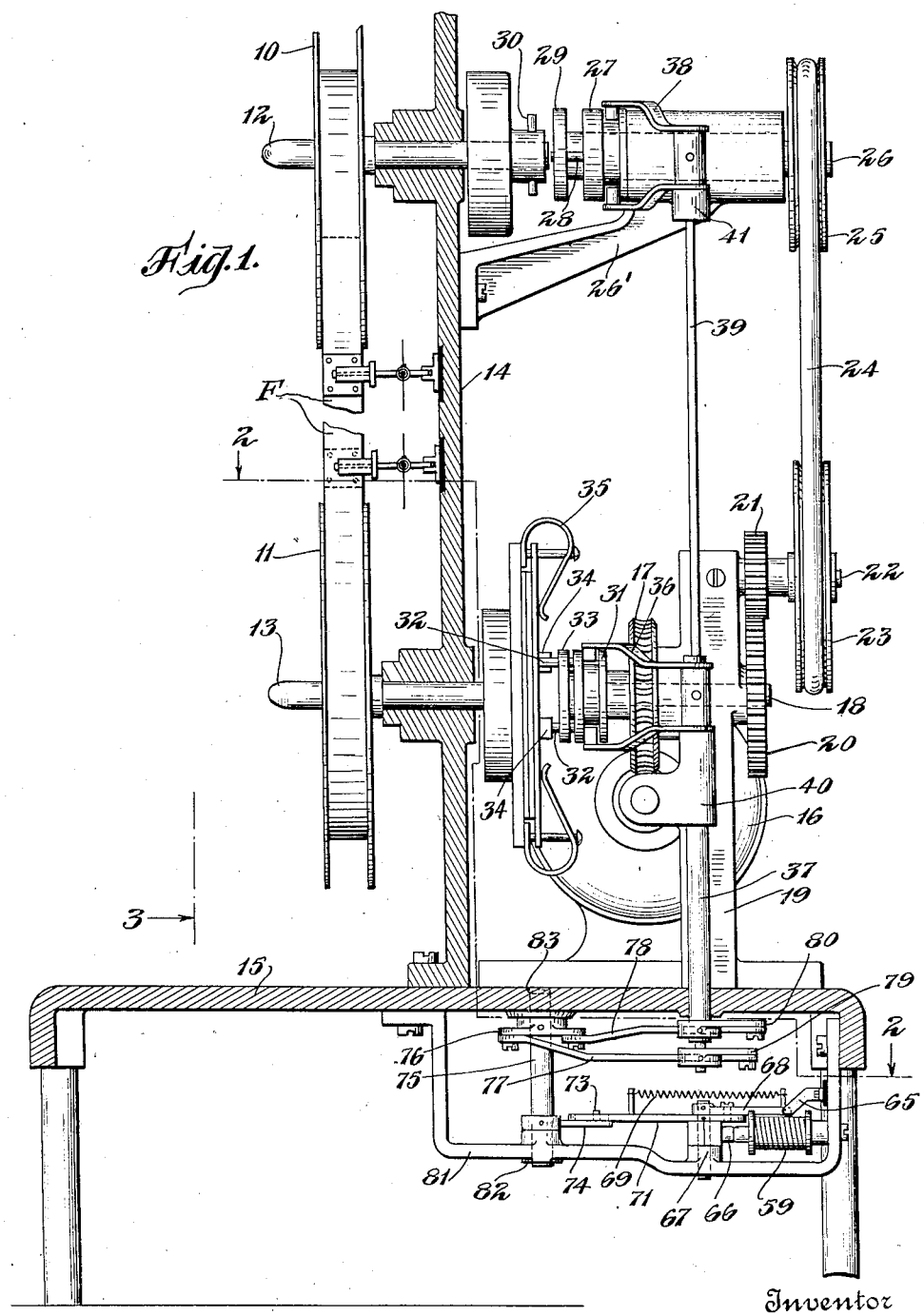

2,007,214

UNITED STATES PATENT OFFICE 2,007,214

REPEATING MECHANISM FOR PROJECTING MACHINES

Barton Allen Proctor, Larchmont, N. Y., assignor to Kinatome Patents Corporation, a corporation of New York Refiled for abandoned application Serial No. 71,887, November 28, 1925. Renewed April 19, 1930. This application November 8, 1932, Serial No. 641,812

8 Claims. (Cl. 242—55)

This application is refiled for my abandoned application Serial No. 71,887, filed November 28, 1925, and renewed April 19, 1930.

The present invention relates to projecting machines, and is more particularly directed toward a projecting machine which is designed automatically to repeat the exhibition of a picture. The picture is passed through the projector to be exhibited, and is then automatically re-rolled so that it may again be exhibited.

The projector is preferably operated by an electric motor which runs all the time. This motor drives, through suitable gear trains or pulleys, a pair of shafts which are placed adjacent to the shafts carrying the reels of film, and clutches are provided so that one motor driven shaft may be connected to the corresponding reel shaft at the same time that the other is disconnected. The shifting of these clutches alternately drivingly to connect the reel shafts to the motor is a convenient method of accomplishing the re-rolling of the film. To insure satisfactory operation, it is desirable that this clutching and declutching be accomplished positively and at the right time.

While there are various manners in which this re-rolling operation may be controlled, the present invention relates, more particularly, to controlling it by means of instrumentalities carried near the ends of the film which cooperate with movable members or contacts carried adjacent the movable film.

According to the present invention, devices to be actuated at the time the film is to be reversed are under the control of some instrumentality carried by and moving with the film. A variation in the otherwise regular dimensions of the film is utilized to set in motion the clutch shifting mechanism. This may be brought about electrically or mechanically. Where contacts are utilized, the electrical circuits of electromagnetically operated clutch shifting mechanism may be made and broken by cams or other devices arranged near the ends of the film.

Motion picture film is ordinarily made of thin transparent material such as celluloid, and a reel of such film, after a relatively small amount of use, is likely to be broken at one or more points. Such breaks are ordinarily repaired by overlapped joints, commonly called "patches" in the art. A feature of my invention resides in the provision of a film having one or more predeterminedly positioned control portions of the film thicker than usual patches and a control mechanism disposed at points along the film path and arranged to be actuated by such thickened portions of the film, and having means for passing ordinary film patches by without being actuated by such patches.

The present invention also contemplates the provision of a special form or type of film suitable for use with an automatically reversing projecting machine.

It is therefore an object of the present invention to provide a film whose end portions differ in some manner from the remainder of the film, and to provide a mechanism, electrical or mechanical, for accomplishing the reversal of the film when the end portion of the film comes off the corresponding reel.

Means for defining a portion of the film path at the optical axis of a projecting machine is an essential part of such a machine. Such path defining means is commonly called a "gate" and usually includes a fixed path defining member and a yieldingly mounted member arranged for pressing the film against said fixed member. Another feature of my invention resides in the provision of a predeterminedly positioned control portion of the film which is thick enough to actuate cooperating control mechanism, and thin enough to pass such mechanism without causing excessive strain on the film.

A further feature of my invention resides in the provision of a predeterminedly positioned control element on the film integrally joined thereto whereby it may be passed by such control mechanism as is mentioned above in operative engagement therewith without danger of being detached from the film.

Other and further objects of the invention will be apparent as the description proceeds.

The accompanying drawings show, for purposes of illustrating the invention, several of the many possible embodiments in which the invention may take form, it being understood that the invention may be embodied in various other forms, and that the drawings are illustrative of the invention rather than limiting the same.

In these drawings:

Figure 1 is a side elevation of a projecting machine with parts in section and showing an electrical clutch-shifting mechanism;

Figure 2 is a schematic view of the control means of the invention.

Figure 3 is an enlarged view of the form of contact mechanism shown in Figure 2, and taken on the line 3—3 thereof;

Figure 4 is a diagrammatic view showing a usual projector gate and a thickened control portion of the film.

Figure 5 is a view similar to Figure 3 showing ordinary film between the control members.

The mechanism for carrying out the clutch-shifting operation, as shown in Figures 1 to 5 of the present drawings, may be in the form of electromagnetic devices which are actuated in response to contact mechanisms so disposed that they may be controlled by suitable instrumentalities carried near the ends of the film.

As shown in Figures 1 and 4, a pair of film reels 10 and 11 are carried on reel shafts 12 and 13, suitably mounted on a vertical plate 14 so that the film F may be transferred from one reel to the other. This plate 14 is mounted on top of a table or platform 15. An electric motor 16 is suitably mounted on the platform 15 behind the plate 14, and this motor is drivingly connected with a worm wheel 17 carried on a shaft 18 in line with the reel shaft 13. This shaft is mounted in bearings in an upright standard 19, and carries a spur gear 20, which meshes with a pinion 21 carried on a shaft 22, also supported from the standard 19. This shaft 22 carries a pulley 23, and a belt 24 drivingly connects this pulley with a pulley 25 carried on a shaft 26. This upper shaft 26 is supported in a bracket 26' so as to be in line with the reel shaft 12.

As here shown, the upper shaft 26 carries a sliding collar 27 provided with pins 28, which pass through a flange 29 integral with the shaft 26. When this collar is moved toward the left, the pins 28 are enabled to engage with pins 30 carried on the inner end of the reel shaft 12, so as to drivingly connect the shafts 26 and 12. The shaft 18 is also provided with a similar sliding collar 31, which has pins 32 passing through the flange 33 and engageable with abutments 34 carried on the lower reel shaft 13. As the step-by-step mechanism for advancing the film forms no part of the present invention, it is omitted from the drawings.

As is well known by those skilled in the construction and use of picture projecting machines, it is usual to employ film guiding means in such machines which dispose the film in operative relation to the usual step-by-step film advancing mechanisms as well as hold the film in cooperative relation with the source of light for projection purposes. In Figure 4 a diagrammatic representation of a film guiding gate commonly used in projecting machines is shown for purposes of illustrating certain advantageous features of the present invention. Such a gate usually includes a fixed gate section 190 and a movable gate section 191 which may be hingedly mounted in a well known way for movement away from the fixed gate section to open position for threading the film through the gate in a usual way. The movable section is thereafter moved up to operative position against the fixed gate section to press the film between the sections.

The movable gate section 191 is commonly urged against the fixed gate section 190 by yielding means such as a light spring 192. Such a gate as is shown in Figure 4 is placed intermediate the reels 10 and 11 at a suitable point along the film path for cooperation with the optical axis of the apparatus. Usual means (not shown) may guide the film into and out of the gate.

The mechanism which compensates for the varying diameter of the roll of film on the take-up reel, consists essentially of a slip clutch and is indicated generally by the reference character 35.

It will thus be apparent that the motor 16 may be drivingly connected with either of the shafts 12 or 13 so as to wind the film onto the reel carried by the driven shaft. The gear trains are so proportioned that the film rewinds onto the upper reel more rapidly than it is wound onto the lower reel when being exhibited.

A convenient mechanism for simultaneously shifting the clutches 27 and 31 so as to alternately connect the motor to the shafts, is shown in the drawings. Here the lower collar 31 is connected by a yoke 36 with a hollow vertical shaft 37 which extends down below the platform 15, while the upper collar 27 is connected by a similar yoke 38 with a shaft 39, which passes down through the inside of the shaft 37. These shafts are suitably mounted in bearings 40 and 41 carried by the framework of the machine. The shifting of the clutches may be accomplished by quickly moving one of these shafts in one angular direction and the other in the opposite direction.

According to the preferred form of the invention illustrated in Figures 2 and 3, the ends of the film F are loaded with strips 182 and 183 which serve to thicken the film. The strips may be secured to the film by small pin members of a well known kind, or by cementing in a well known way, if the strips are made of celluloid as they ordinarily would be by those skilled in the art. The front plate 14 of the machine carries contact mechanism which is to be actuated by the movement of the film. As here shown, a pair of levers 84 and 85 are pivotally mounted on a support 86 insulatively carried by the front plate. These levers are provided with small rollers 87 and 88 at their free ends, and these rollers are urged toward one another by a small coiled spring 89, placed between the levers. To prevent the rollers from pressing against the film itself, they are provided with flanges 90 which limit the movement of these parts. It can be seen by inspection of Figures 3 and 5 that the diameters of the flanges 90 relative to the diameters of the rollers 87 and 88 and to the thickness of the film F are such that when the flanges 90 are engaged one against the other as shown in Figure 5, a clearance considerably greater than the thickness of the film is provided between the rollers 87 and 88. This clearance is such that the film M may pass freely between the rollers 87 and 88 in contact with only one roller. Sufficient space is left between the other roller and the adjacent surface of the film to permit slight inequalities in the thickness of the film to pass between the rollers 87 and 88 without causing any strain on the film or causing operative movement of the contact 84. Slight inequalities in the thickness of a motion picture film are often caused by patches, i. e., where overlapping end portions of the film are fastened together, usually by cementing, to repair breaks in the film. The thickness of such patches does not usually exceed and is commonly less than twice the thickness of the film since the overlapping ends are usually scraped. It is an advantageous feature of my invention to provide control means actuated by the film which will permit such patches to pass without actuating the control means.

While this circuit control may include magnets corresponding with each contact and which remain in circuit as long as the contacts are closed, it is preferable to provide supplemental contacts which are opened when the magnets function, thereby preventing overheating of the magnets and unnecessary current consumption. As an illustrative embodiment of such a control, I have herein shown, and will now describe, an arrangement utilizing an oscillating armature and switch contact. Many other arrangements may, of course, be used.

As shown in Figure 2, the incoming current supply leads are shown at 56 and 57. The lead 57 is connected by wires 93 and 94 to the movable contacts 91 of the switches. The fixed contact 92 of the upper switch as viewed in new Figure 2 connected by a wire 95 with a magnet coil 59, the other side of which is connected by a wire 60 with a supplemental contact 61. The lower fixed contact 92 is connected by a wire 62 with magnet coil 63, which is connected by a wire 64 with another supplemental contact 65. The armature 66, for the magnet coils 59 and 63, is pivoted at 67, and is provided with pole pieces opposite the magnet coils.

An oscillating switch member 68 is mounted so that it can be moved back and forth between the supplemental contacts 61 and 65. For convenience it is here shown as being mounted about the same pivot as the armature. This oscillating contact is under the control of a spring 69 and its pivot is connected by wire 70 with the supply lead 56. The armature 66 may be moved back and forth in an obvious manner by the electromagnets, and in the present embodiment of the invention this swinging armature is interconnected by suitable mechanism with the clutch controlling shafts 37 and 39.

As here shown, an arm 71 extends out from the armature. This arm carries an end of the spring 69 and is provided with a slot 72 which engages on a pin 73 on an arm 74 carried on a vertical shaft 75. These connections are such that the shaft may be rocked when either electromagnet coil is energized. The shaft 75 is provided with a crosshead 76 which is connected by arms 77 and 78 with cranks 79 and 80 carried in the lower ends of shafts 37 and 39, respectively.

The electromagnetically controlled devices and supplemental contacts may be conveniently mounted underneath the platform 15. They may be carried on a U-shaped frame 81 suitably attached to this platform. The shaft 75 is mounted in bearings 82 and 83, while the armature 66 of the electromagnet may be mounted on a shaft 67 carried by this under-frame. The magnets and supplemental contacts may be mounted on the other side of the frame 81, as indicated.

As shown in Figure 3, the contacts 91 and 92 have been closed to energize the magnet coil 59 which attracts the armature 66 and swings the system of oscillating levers and shafts to the position which will cause the motor drive to be disconnected from the lower shaft and connected to the upper shaft. When the armature is moved into the position, shown in full lines, the spring 69 will be carried across the center 67, about which the switch member 68 is pivoted, and the contraction of this spring will pull the switch member 68 away from the supplemental contact 61 and against the supplemental contact 65 thereby breaking the circuit of the magnet coil 59 and closing one of the openings in the circuit of the magnet coil 63. When the parts are in the position indicated in Figure 4, both circuits are open; that for the magnet coil 59 being opened between the contact switch member 61 and member 68, and that for the magnet coil 63 being opened between the contacts 91 and 92. When the film winds onto the upper roll to the predetermined amount, the thickened portion 183 on the film will cause contacts 91 and 92 to close and energize magnet coil 63 thereby shifting the armature and all the oscillating parts to the other position. The spring 69 will snap the switch member 68 so as to open the circuit, and assists in providing power to operate the oscillating parts so as to shift the clutches. It also holds the clutches in position after the magnets have been de-energized.

One of the levers, as here shown the lever 84, carries a contact 91, while a cooperative stationary contact 92 is carried on the end of an arm 193, also insulatively supported from the front end of the machine. Similar contact mechanism may be provided near the other reel to cooperate with the thickened portion 183 at the other end of the film. The movable contacts 91 are, as here shown, connected by wires 93 and 94 with the incoming supply lead 57, while the stationary contacts 92 are connected by wires 95 and 96 with the electromagnetic devices and supplemental contacts which may be arranged as above described with respect to Figure 2, the same reference characters being here applied.

When the end of the film is approached one or the other of the thickened portions 182 and 183 will engage with and actuate the corresponding pair of levers so as to close the adjacent contact. This will energize the corresponding magnets and cause the shifting of the clutches and opening the circuits in the same manner as above described.

From the foregoing, it will be apparent that a simple practical arrangement has been provided for reversing the winding and rewinding reels so as to carry the film back and forth through the projection machine. In the arrangement herein shown the reversal is accomplished by the passage of some instrumentality (such as a cam or thickened portion of the film) past some stationarily carried element (such as a movable contact) supported adjacent the film where it comes off from the reel. The devices are so arranged that the effective part of the instrumentality carried by the film may pass by the cooperating element without imposing an excessive load on the film and without any tendency to destroy or injure the film. Irrespective of whether the device is electrically or mechanically operated, it will be noted that it is so arranged that automatic operation may be carried out effectively. The small amount of energy which is available in the device directly influenced by film movement is utilized to set in motion some other more powerful device for accomplishing the shifting of the clutches. The power of the electromagnets is used for shifting the clutches.

It is obvious that the invention may be employed in many forms and constructions, and I wish it to be understood that the particular form shown is but one of many forms which may be used. Various modifications and changes being possible, I do not limit myself in any way with respect thereto. Certain of the constructions herein disclosed are claimed in other copending applications.

I claim:

1. In combination, a film having a thickened portion therein; a film handling apparatus including a support for said film, means for moving said film in relation to said support, and operable means movable to affect the movement of said film in relation to said support; and control mechanism, said control mechanism including two control members mounted upon said apparatus and extending therefrom in a direction parallel to the side of the film as it is fed in relation to said support, one of said control members being movably mounted, one of said control members being disposed upon one side of the film and the other being disposed upon the other side thereof and adjacent thereto, a spring for moving said movable control member toward the other thereof, oppositely disposed flanges upon the free end of each of said control members for limiting the movement of said control members in relation to each other whereby a film or ordinary thickness can be moved between the free ends of said control members without pressure therefrom and the thickened portion of the film when moved between said free ends serves to move said movable control member away from the film, and operative connections between said control member so moved and said operable means of said apparatus for operating said operable means upon the movement of said movable control member.

2. In combination, a film having a thickened portion therein; a film handling apparatus including a support for said film, means for moving said film in relation to said support, and operable means movable to affect the movement of said film in relation to said support; and control mechanism, said control mechanism including two levers pivotally mounted upon said apparatus and extending therefrom in a direction parallel to the side of the film as it is fed in relation to said support, one of said levers being disposed upon one side of the film and the other being disposed upon the other side thereof and adjacent thereto, a roller mounted at the free end of each of said levers, a spring for moving said levers toward each other, oppositely disposed flanges upon each of said rollers for limiting the movement of said levers toward each other whereby a film of ordinary thickness can be moved between said rollers without pressure therefrom and the thickened portion of the film when moved between said rollers serves to move at least one of said levers away from the film, and operative connections between said lever so moved and said operable means of said apparatus for operating said operable means by the movement of said movable lever.

3. In combination, a film having a thickened reinforced portion therein; a film handling apparatus including a support for said film, means for moving said film in relation to said support, and operable means movable to affect the movement of said film in relation to said support; and control mechanism, said control mechanism including two control members mounted upon said apparatus, and extending from said apparatus in a direction parallel to the side of the film as it is fed in relation to said support, one of said control members being movably mounted, one of said control members being disposed upon one side of the film and the other being disposed upon the other side thereof and adjacent thereto, a spring for moving said control members toward each other, oppositely disposed flanges upon the free ends of said control members for limiting the movement of said control members in relation to each other whereby a film of ordinary thickness can be moved between the free ends of said control members without pressure therefrom and the thickened portion of the film when moved between said free ends serves to move at least one of said control members away from the film, an electric circuit one side of which includes said movable control member, a contact member included in the other side of said circuit and so disposed that the movement of said movable member forms contact therewith whereby said circuit is closed, and electromagnetic means for operating said operable means of said apparatus upon the closing of said circuit.

4. In a film handling apparatus having film-path-defining means including a fixed film guiding member and a movable member arranged for yieldingly pressing the film against said fixed member, in combination, a first reel, a second reel, said reels being disposed one on each side of said film-path-defining means, means for revolving said reels for winding and rewinding the film between them, means operable for controlling said revolving means for changing the direction of movement of the film, said control means including two cooperating members, at least one of said control members being movably mounted and disposed on the opposite side of the film path from the other control member, and means carried by the film for actuating said control means, said last named means including a member fastened on one face of the film, said cooperating control members being spaced apart a distance less than the total thickness of the film and said actuating member, said actuating member being effective to cause relative movement of said cooperating members one to the other.

5. In a film handling apparatus adapted for use with a film made up of a plurality of lengths joined, one to the other, by film patches, said apparatus including two film carriers and a yielding film-path-defining means positioned between said carriers, the combination of an operable member of said apparatus to be automatically controlled, a predeterminedly positioned portion of said film formed with a cross section which is thicker than the cross section of the patched portions of said film, means for operatively moving said film through said apparatus, said control means including two members between which said film is moved, at least one of said members being disposed adjacent the film path and arranged for contact with and movement by said thickened film portion for actuating said control means, and means cooperating with said control means for providing for passing said thickened portion by said control member, said last named means including means permitting movement of said movable control member away from the other of said control members enough to provide a passageway therebetween for said thickened portion.

6. In a film handling apparatus adapted for use with a film made up of a plurality of lengths joined, one to the other, by film patches, said apparatus having two film carriers between which said film extends, the combination of operable means for winding and rewinding the film from one of said carriers to the other, a predeterminedly positioned portion of said film formed with a cross section which exceeds in thickness the cross section of patched portions of said film, control means for said winding and rewinding means, said control means including an electric circuit, a switch in said circuit, and a member for closing and opening said switch, said member being arranged for contact with and operable movement by said thickened film portion, and means cooperating with said control means for passing patched portions of the film by said switch operating control member without operably moving the same.

7. In a film handling apparatus, a pair of film winding and rewinding reels, means for revolving said reels for winding and rewinding the film between them, means for controlling said revolving means, and means for actuating said controlling means including at least one predeterminedly positioned control portion of said film, said portion having a thickness exceeding that of an ordinary portion of the film, at least one control member disposed adjacent the film path for contact with said thickened film portion to be materially moved thereby transversely to said film path, and means cooperating with said control member arranged for permitting movement of said thickened end portion past said control member after the same has been operatively moved by said thickened portion.

8. In a film handling apparatus, a pair of film winding and rewinding reels, means for revolving said reels for winding and rewinding the film between them, means for controlling said revolving means, and means for actuating said controlling means, said last named means including at least one predeterminedly positioned control portion of the film, said portion having a thickness exceeding that of an ordinary portion of the film, and two control members positioned on opposite sides of the film, at least one of said control members being movable in a direction normal to the film path by said thickened film portion for actuating said control means.

BARTON A. PROCTOR.